United States Patent [19]
Gengo et al.

[11] Patent Number: 5,770,163
[45] Date of Patent: Jun. 23, 1998

[54] SYSTEM FOR THE RECOVERY OF AMMONIA ESCAPING FROM AN AMMONIA REDUCTION DENITRATOR

[75] Inventors: Tadashi Gengo; Norihisa Kobayashi; Koichi Sakamoto, all of Tokyo, Japan

[73] Assignee: Mitsubishi Jukogyo Kabushiki Kaisha, Tokyo, Japan

[21] Appl. No.: 638,468

[22] Filed: Apr. 26, 1996

Related U.S. Application Data

[63] Continuation of Ser. No. 360,585, Dec. 21, 1994, abandoned.

[51] Int. Cl.$^6$ .................................................. B01D 53/34
[52] U.S. Cl. ........................ 422/171; 422/168; 422/169; 422/170; 422/172; 422/178; 96/144; 110/345
[58] Field of Search ..................................... 422/168–172, 422/178; 423/237, 235; 95/93, 128–129; 96/145, 144; 110/345

[56] References Cited

U.S. PATENT DOCUMENTS

| | | | |
|---|---|---|---|
| 5,069,886 | 12/1991 | Frey et al. | 422/171 |
| 5,142,864 | 9/1992 | Dunne | 60/274 |
| 5,158,582 | 10/1992 | Onitsuka et al. | 95/129 |
| 5,176,088 | 1/1993 | Amrhein et al. | 422/169 |
| 5,294,409 | 3/1994 | Cohen et al. | 422/169 |
| 5,435,981 | 7/1995 | Ichiki et al. | 423/239.1 |

FOREIGN PATENT DOCUMENTS

| | | |
|---|---|---|
| 0 261 610 A1 | 3/1988 | European Pat. Off. . |
| 0 268 118 A2 | 5/1988 | European Pat. Off. . |
| 0 290 947 A1 | 11/1988 | European Pat. Off. . |
| 0 469 593 A1 | 2/1992 | European Pat. Off. . |
| 0 567 964 A2 | 11/1993 | European Pat. Off. . |
| 0 590 744 A1 | 4/1994 | European Pat. Off. . |
| 3539001 C1 | 9/1986 | Germany . |
| 3526756 A1 | 1/1987 | Germany . |

OTHER PUBLICATIONS

Database WPI & JP–A–53 125 962.
Database WPI & JP–A–53 077 872.
Database WPI & JP–A–50 026 797.
Patent Abstracts of Japan vol. 007, No. 039 & JP–A–57 190 640.
Patent Abstracts of Japan vol. 004, No. 050 & JP–A–55 023 069.

Primary Examiner—Hien Tran
Attorney, Agent, or Firm—Fish & Richardson P.C.

[57] ABSTRACT

For a system having a source of nitrogen oxide-containing gas, an ammonia reduction denitrator, and a leak ammonia recovery unit which adsorbs and removes ammonia escaping from said ammonia reduction denitrator, a method of removing adsorbed ammonia from said leak ammonia recovery unit and reusing the removed ammonia is provided which includes the steps of: introducing hot exhaust gas discharged from said nitrogen oxide-containing gas source into said leak ammonia recovery unit to desorb ammonia therefrom; after desorption of ammonia, cooling said heated leak ammonia recovery unit with cool air; and feeding ammonia carried away by said hot exhaust gas and said cool air to an upstream side of said ammonia reduction denitrator or to the source of nitrogen oxide-containing gas.

6 Claims, 8 Drawing Sheets

SYSTEM FOR THE RECOVERY OF AMMONIA ESCAPING FROM AN AMMONIA REDUCTION DENITRATOR

This is a continuation of application Ser. No. 08/360,585, filed Dec. 21, 1994, now abandoned.

TITLE OF THE INVENTION

Method for the Recovery of Ammonia Escaping from an Ammonia Reduction Denitrator

BACKGROUND OF THE INVENTION

1. Field of the Invention

This invention relates to a method for recovering ammonia from an ammonia recovery unit which removes by adsorption ammonia escaping from an ammonia reduction denitrator in a system in which an exhaust gas containing nitrogen oxides is denitrated in the ammonia reduction denitrator.

2. Description of the Related Art

Figure 8:
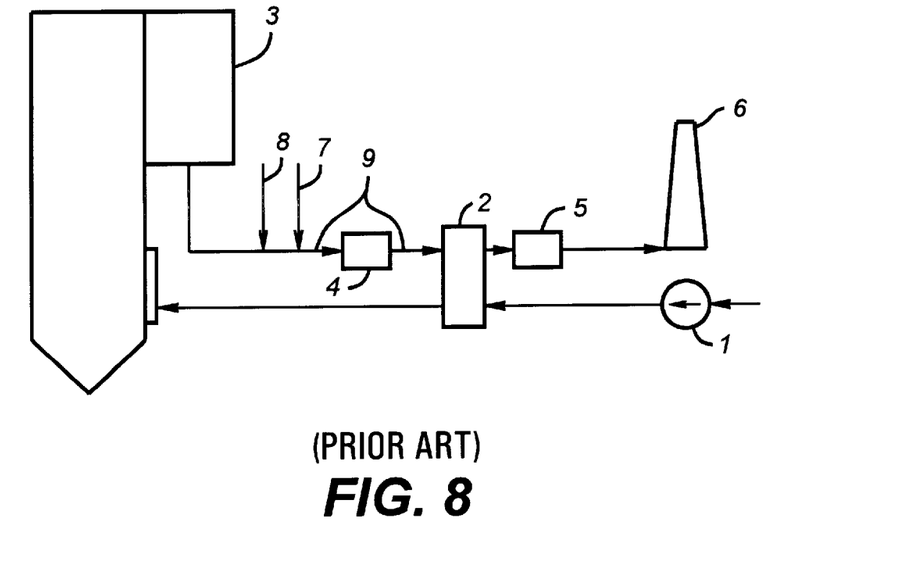
FIG. 8 is a schematic view illustrating a conventional system for the recovery of leak ammonia.

FIG. 8 is a schematic illustration of the flue and air duct of a boiler system serving as an example of the conventional system. In FIG. 8, reference numeral 1 designates a forced draft fan; 2 an air preheater; 3 a boiler; 4 a dry denitrator; 5 a leak ammonia recovery unit; 6 a smoke stack; 7 an ammonia injection line; 8 a regenerated ammonia injection line; and 9 a flue. Nitrogen oxides produced in the boiler 3 are introduced into the dry denitrator 4 where they undergo a denitration reaction with ammonia fed to flue 9 through the ammonia injection line 7. A portion of the fed ammonia which remains unreacted in the dry denitrator (so-called "leak ammonia") is recovered by the leak ammonia recovery unit 5, regenerated, and fed again to the flue 9 through the regenerated ammonia injection line 8 as ammonia useful for the denitration reaction in the dry denitrator 4.

Although the boiler system having the dry denitrator 4 is illustrated in FIG. 8 as an example of the conventional art, the present invention is not necessarily limited to the use of an ammonia reduction dry denitrator 4, so long as the system is such that leak ammonia is present in the flue 9. One example is the so-called non-catalytic denitration system in which denitration is carried out by introducing ammonia into the hot gas from a boiler 3 to react the nitrogen oxides in the hot gas directly with the ammonia, instead of installing the ammonia reduction dry denitrator 4.

Figure 9:
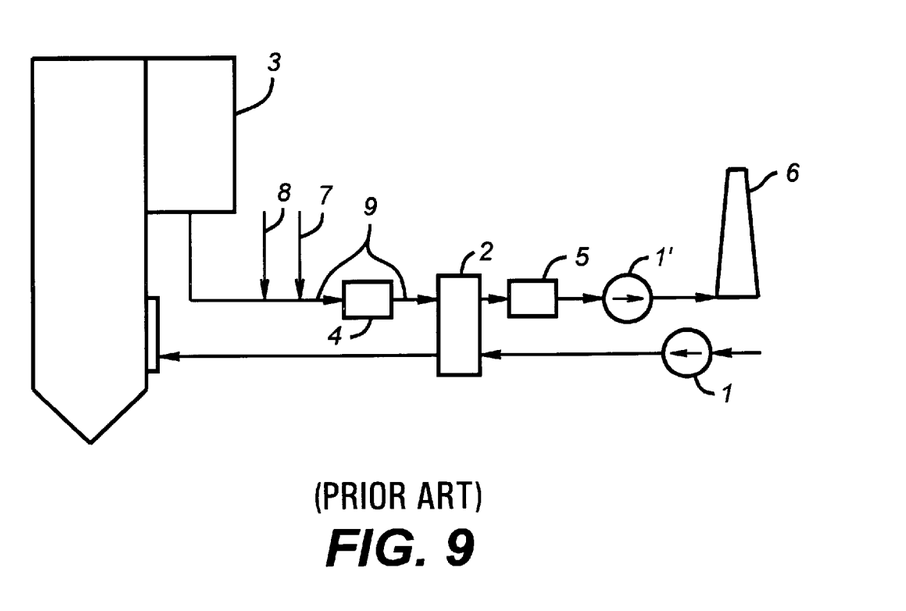
FIG. 9 is a schematic view illustrating another conventional system for the recovery of leak ammonia.

As another example of the conventional art, a schematic illustration of a boiler exhaust system constructed by adding an induced draft fan to that of FIG. 8 is shown in FIG. 9. In FIG. 9, the same components as those illustrated in FIG. 8 are designated by the same reference numerals and no explanation thereof is given. An induction fan 1' is disposed between the leak ammonia recovery unit 5 and the smoke stack 6.

It is a characteristic of the leak ammonia recovery unit 5 which recovers leak ammonia on the downstream side of denitrator 4 that ammonia is adsorbed in the unit at low temperatures, for example, of about 100° C. or below, and the adsorbed ammonia is desorbed from the unit at high temperatures, for example, of 300° to 400° C. Accordingly, when the boiler systems illustrated in FIGS. 8 and 9 are taken as examples, a means for heating the leak ammonia recovery unit 5 to an appropriate temperature is indispensably required so that the ammonia adsorbed in the leak ammonia recovery unit 5 at low temperatures can be desorbed therefrom and taken out as regenerated ammonia. Moreover, a cooling means is also required so that, after the ammonia has been removed by heating, the heated leak ammonia recovery unit 5 can be restored to the low-temperature condition which permits the adsorption and recovery of leak ammonia. At the same time, a means for recovering the heat retained by the heated leak ammonia recovery unit 5 without releasing it wastefully from the system is also required.

SUMMARY OF THE INVENTION

In view of the above-described technical level and in answer to the above-described need, an object of a first aspect of the present invention is to provide a suitable method for the recovery of ammonia from a denitrator.

Another object of a second aspect of the present invention is to provide an improvement over the method according to the first aspect of the present invention.

Still another object of a third aspect of the present invention is to provide another improvement over the method according to the first aspect of the present invention.

According to the first aspect of the present invention, there are provided:

(1) In a system comprising a source of nitrogen oxide-containing gas, an ammonia reduction denitrator, and a leak ammonia recovery unit which recovers ammonia escaping from the ammonia reduction denitrator, a method of removing adsorbed ammonia from said leak ammonia recovery unit and reusing the removed ammonia, which comprises the steps of: introducing hot exhaust gas discharged from said nitrogen oxide-containing gas source into said leak ammonia recovery unit to desorb ammonia therefrom; after the desorption of ammonia, cooling said heated leak ammonia recovery unit with cool air supplied by means of a forced draft fan; and feeding the ammonia carried away by said hot exhaust gas and said cool air to the upstream side of said ammonia reduction denitrator.

(2) In a system comprising a source of nitrogen oxide-containing gas, an ammonia reduction denitrator, and a leak ammonia recovery unit which recovers leak ammonia escaping from the ammonia reduction denitrator, a method of removing adsorbed ammonia from said leak ammonia recovery unit and reusing the removed ammonia, which comprises the steps of: introducing hot exhaust gas discharged from said nitrogen oxide-containing gas source into said leak ammonia recovery unit to desorb ammonia therefrom; after the desorption of ammonia, cooling said heated leak ammonia recovery unit with cool air supplied by means of a fan provided exclusively for this purpose; and feeding the ammonia carried away by said hot exhaust gas and said cool air to the upstream side of said ammonia reduction denitrator.

(3) In a system comprising a source of nitrogen oxide-containing gas, an ammonia reduction denitrator, and a leak ammonia recovery unit which recovers leak ammonia escaping from the ammonia reduction denitrator, a method of removing adsorbed ammonia from said leak ammonia recovery unit and reusing the removed ammonia, which comprises the steps of: introducing hot exhaust gas discharged from said nitrogen oxide-containing gas source into said leak ammonia recovery unit to desorb ammonia therefrom; after the desorption of ammonia, cooling said heated leak ammonia recovery unit with cool exhaust gas taken from the system by means of a fan provided exclusively for this purpose; and feeding the ammonia carried away by said hot exhaust gas and said cool exhaust gas to the upstream side of said ammonia reduction denitrator.

(4) A method as described in any of paragraphs (1)–(3) above, wherein said hot exhaust gas used to desorb ammonia from said leak ammonia recovery unit is adjusted to an appropriate temperature by mixing said hot exhaust gas with cool exhaust gas or cool air.

(5) A method as described in any of paragraphs (1)–(3) above wherein said hot exhaust gas discharged from said nitrogen oxide-containing gas source is further heated by means of a heat source before it is used as a desorption gas for desorbing ammonia from said leak ammonia recovery unit.

Thus, according to the first aspect of the present invention, a part or all of the hot exhaust gas discharged from a boiler or nitrogen oxide-containing gas source is introduced into the leak ammonia recovery unit which has adsorbed ammonia so as to desorb the adsorbed ammonia therefrom. Thereafter, the heated leak ammonia recovery unit is cooled by introducing thereinto cool exhaust gas discharged from the boiler or the source of nitrogen oxide-containing gas, or cool air, so that the leak ammonia recovery unit is restored to the condition which permits the adsorption and removal of leak ammonia. In the same manner as with the ammonia injection line inherently included in the system, the ammonia desorbed by the hot exhaust gas and the ammonia-containing exhaust gas or air obtained when the heated leak ammonia recovery unit is cooled with cool exhaust gas or cool air as described above are fed to the upstream side of the ammonia reduction denitrator in order to utilize the recovered ammonia.

In preferred embodiments, when the ammonia adsorbed in the leak ammonia recovery unit is to be desorbed therefrom, the hot exhaust gas discharged from the boiler or the source of nitrogen oxide-containing gas may be adjusted to a temperature appropriate for ammonia desorption by mixing the hot exhaust gas with cool exhaust gas discharged from the boiler or the source of nitrogen oxide-containing gas, or with cool air such as ambient air. Alternatively, a part or all of the hot exhaust gas discharged from the boiler or the nitrogen oxide-containing gas source may be heated by means of a heat source, such as electric heater, heat exchanger or burner, before it is introduced into the leak ammonia recovery unit in which leak ammonia has been adsorbed.

By introducing a part or all of the hot exhaust gas discharged from the boiler or the source of nitrogen oxide-containing gas into the leak ammonia recovery unit in which ammonia has been adsorbed, the leak ammonia recovery unit becomes heated and the ammonia is desorbed therefrom. After desorption of the ammonia, the heated leak ammonia recovery unit is cooled by introducing thereinto cool air or cool exhaust gas discharged from the boiler or the source of nitrogen oxide-containing gas. Then, the exhaust gas or air used to cool the heated leak ammonia recovery unit is heated by the heated leak ammonia recovery unit. This exhaust gas or air is fed to the inlet of the ammonia reduction denitrator through the same line as the regenerated ammonia injection line for feeding the gas which contains ammonia desorbed by the hot exhaust gas or through a line independent of the regenerated ammonia injection line. Thus, the ammonia recovered in the leak ammonia recovery unit can be utilized effectively, and the system can be simplified.

This exhaust gas or air is conducted to the inlet of the denitrator either through the regenerated ammonia injection line or through a line independent of the regenerated ammonia injection line. In either case, if a heat exchanger, such as an air preheater, is installed on the downstream side of the denitrator for the purpose of recovering heat from the exhaust gas discharged from the boiler or the source of nitrogen oxide-containing gas, it is possible to recover heat from the exhaust gas or air used to cool the leak ammonia recovery unit and heated thereby. Thus, an improvement in efficiency can be achieved as compared with the case in which the exhaust gas or air used to cool the leak ammonia recovery unit is discharged directly from the boiler or nitrogen oxide-containing gas source.

In one preferred embodiment of the first aspect of the present invention, the hot exhaust gas discharged from the boiler or source of nitrogen oxide-containing gas is mixed with cool air, such as ambient air, or cool exhaust gas discharged from the boiler or source of nitrogen oxide-containing gas, so that the ammonia desorption gas introduced into the leak ammonia recovery unit can be adjusted to an appropriate temperature.

By mixing the hot exhaust gas discharged from the boiler or source of nitrogen oxide-containing gas with cool air, such as ambient air, or with cool exhaust gas discharged from the boiler or source of nitrogen oxide-containing gas, the hot exhaust gas used to desorb ammonia from the leak ammonia recovery unit can be adjusted to an appropriate temperature. This enables efficient desorption of ammonia.

On the basis of the characteristics the boiler or the source of nitrogen oxide-containing gas, the temperature of the hot exhaust gas discharged therefrom may not be sufficiently high for the desorption of ammonia from the leak ammonia recovery unit when, for example, the boiler or the source of nitrogen oxide-containing gas is operated under partially loaded conditions. It is another preferred embodiment of the first aspect of the present invention that, in such a case, the hot exhaust gas can be heated to a temperature appropriate for the desorption of ammonia by means of a heat source, such as electric heater, heat exchanger or burner, which is installed in the hot exhaust gas line between the boiler or the nitrogen oxide-containing gas source and the leak ammonia recovery unit.

By heating the hot exhaust gas discharged from the boiler or nitrogen oxide-containing gas source by means of a heat source, such as electric heater, heat exchanger or burner, the hot exhaust gas used to heat the leak ammonia recovery unit and desorb ammonia therefrom can be adjusted to an appropriate temperature. This also enables efficient desorption of ammonia.

According to the method of the first aspect of the present invention described above, the ammonia accompanied by the hot and cool gases used for respectively heating and cooling the leak ammonia recovery units is conducted to the ammonia reduction denitrator from its upstream side, so that the ammonia desorbed from the leak ammonia recovery units is used for the denitration reaction of combustion exhaust gas from a boiler or other types of gas from a source of nitrogen oxide-containing gas. However, depending on particular systems to which the method of the first aspect of the present invention is applied, the amount of gas which enters the air preheater or heat exchanger for heating the combustion air before it is brought into the boiler increases and the efficiency of the heat exchange may be degraded because the gas from the leak ammonia recovery unit is added to the gas flowing into the ammonia reduction denitrator and subsequently into the air preheater. This may cause undesirable losses of heat from the system and/or increases in equipment cost for preventing or reducing such losses.

The second aspect of the present invention provides an improvement over the first aspect. That is, the second aspect of the present invention provides, in a system comprising a source of nitrogen oxide-containing gas, an ammonia reduction denitrator, and a leak ammonia recovery unit which recovers leak ammonia escaping from the ammonia reduction denitrator, a method for removing adsorbed ammonia from said leak ammonia recovery unit, comprising the steps of heating said leak ammonia recovery unit so as to desorb ammonia adsorbed in said unit, subsequently cooling said leak ammonia recovery unit with a cooling gas selected from the group consisting of cool air and cool gas, and feeding the used cooling gas to said source of nitrogen oxide-containing gas.

In the second aspect of the present invention, the cooling gas used to cool the ammonia recovery unit can be cool air or cool exhaust gas collected from the flue between the ammonia recovery unit and the stack. After being used to cool the ammonia recovery unit, the cooling gas may be fed to the nitrogen oxide-containing gas source, alone or in admixture with preheated air. Alternatively, where the nitrogen oxide-containing gas source is a boiler, the cooling gas may be fed to the recirculating gas line of the boiler.

According to the second aspect of the present invention, the cooling gas used to cool the ammonia recovery unit from which ammonia has been desorbed is utilized as combustion gas for the nitrogen oxide-containing gas source, instead of being discharged from the system through the regenerated ammonia injection line. Thus, the flow rate of the gas passing through the air preheater can be made equal to the flow rate of the air passing through the same observed when no ammonia recovery unit is installed. Moreover, the temperature level of the exhaust gas at the outlet of the air preheater can be made equal to that observed in the case where no ammonia recovery unit is installed. Consequently, the exhaust gas heat loss of the boiler or nitrogen oxide-containing gas source can be reduced as compared with the conventional method for cooling the ammonia recovery unit. Furthermore, since the air used to cool the ammonia recovery unit is utilized as combustion air, the amount of air supplied by means of a forced draft fan can be decreased correspondingly. Thus, the power consumption of the forced draft fan can be reduced as compared with the conventional method for cooling the ammonia recovery unit.

When the ammonia recovery unit from which ammonia has been desorbed is cooled with cool exhaust gas obtained from the boiler or nitrogen oxide-containing gas source, the used exhaust gas is fed as recirculating gas for the boiler or mixed with combustion air for the boiler. Thus, the flow rate of the gas passing through the air preheater can be made equal to the flow rate of the air passing through the same observed when no ammonia recovery unit is installed. Moreover, the temperature level of the exhaust gas at the outlet of the air preheater can be made equal to the level observed in the case where no ammonia recovery unit is installed. Consequently, the exhaust gas heat loss from the boiler or nitrogen oxide-containing gas source can be reduced as compared with the conventional method for cooling the ammonia recovery unit.

Furthermore, according to the first aspect of the present invention described above, when the ammonia desorbed from leak ammonia recovery unit is fed to the flue for conducting exhaust gas to the ammonia reduction denitrator and the exhaust gas in the flue happens to have a pressure higher than atmospheric pressure, the gas pressure of leak ammonia recovery unit from which ammonia is being desorbed will become higher than that of the exhaust gas within the flue. Consequently, the leak ammonia recovery unit undergoing the desorption of ammonia will also have a gas pressure higher than atmospheric pressure. Since the mixture of hot gas and ammonia desorbed from the leak ammonia recovery unit has a high ammonia concentration, any leakage of gas from a line connecting to the flue and to the ammonia reduction denitrator may be dangerous to the environment and human health, even if the amount of the leaking gas is small.

In addition, when the pressure of the exhaust gas happens to be higher than atmospheric pressure, the required pressure of the hot gas and the cooling gas becomes excessively high. Accordingly, in order to secure a sufficient pressure, the hot gas and the cooling gas must be supplied from high-pressure sources.

In view of possibility of such problems, the third aspect of the present invention provide another method for the recovery of ammonia desorbed from a leak ammonia recovery unit.

The third aspect of the present invention provides, in a system comprising a source of nitrogen oxide-containing gas, an ammonia reduction denitrator and a leak ammonia recovery unit which recovers ammonia escaping from said ammonia reduction denitrator, a method of removing adsorbed ammonia from said leak ammonia recovery unit and reusing the removed ammonia, comprising the steps of desorbing ammonia from said leak ammonia recovery unit by heating said unit with a hot gas, feeding a first gas obtained by desorbing ammonia from said unit to the flue on the inlet side of said ammonia reduction denitrator, cooling said leak ammonia recovery unit with a cool gas after the desorption of ammonia with the hot gas, and feeding a second gas obtained by cooling said unit to said source of nitrogen oxide-containing gas, wherein said first and second gases discharged from said leak ammonia recovery unit are fed to their respective desired injection sites with the aid of a fan.

The first and second gases can be pressurized with the fan or fans to pressures corresponding to the gas pressures of their respective desired injection sites and then fed thereto while the leak ammonia recovery unit is adjusted to an appropriate gas pressure equal to or lower than atmospheric pressure. This enables the leak ammonia recovery unit to be operated under atmospheric pressure.

According to third aspect of the present invention, the leak ammonia recovery and the greater part of the regenerated ammonia injection line can be operated under a pressure equal to or lower than atmospheric pressure by installing a fan or fans in the regenerated ammonia injection lines between the leak ammonia recovery unit and each of the desired injection sites (i.e., the inlet side of the ammonia reduction denitrator and the nitrogen oxide-containing gas source). Thus, even if a leakage of gas from the regenerated ammonia injection line system occurs, its influence on environment and human health can be minimized.

Moreover, since the leak ammonia recovery unit can be operated under a pressure equal to or lower than atmospheric pressure, the hot gas and cooling gas supplied thereto need not have an excessively high pressure. Consequently, it is not always necessary to supply the hot gas and the cooling gas from high-pressure sources. This enables the provision of an ammonia recovery system which does not depend on the pressure of the supply sources of the gases.

DETAILED DESCRIPTION OF THE PREFERRED EMBODIMENTS

Figure 1:
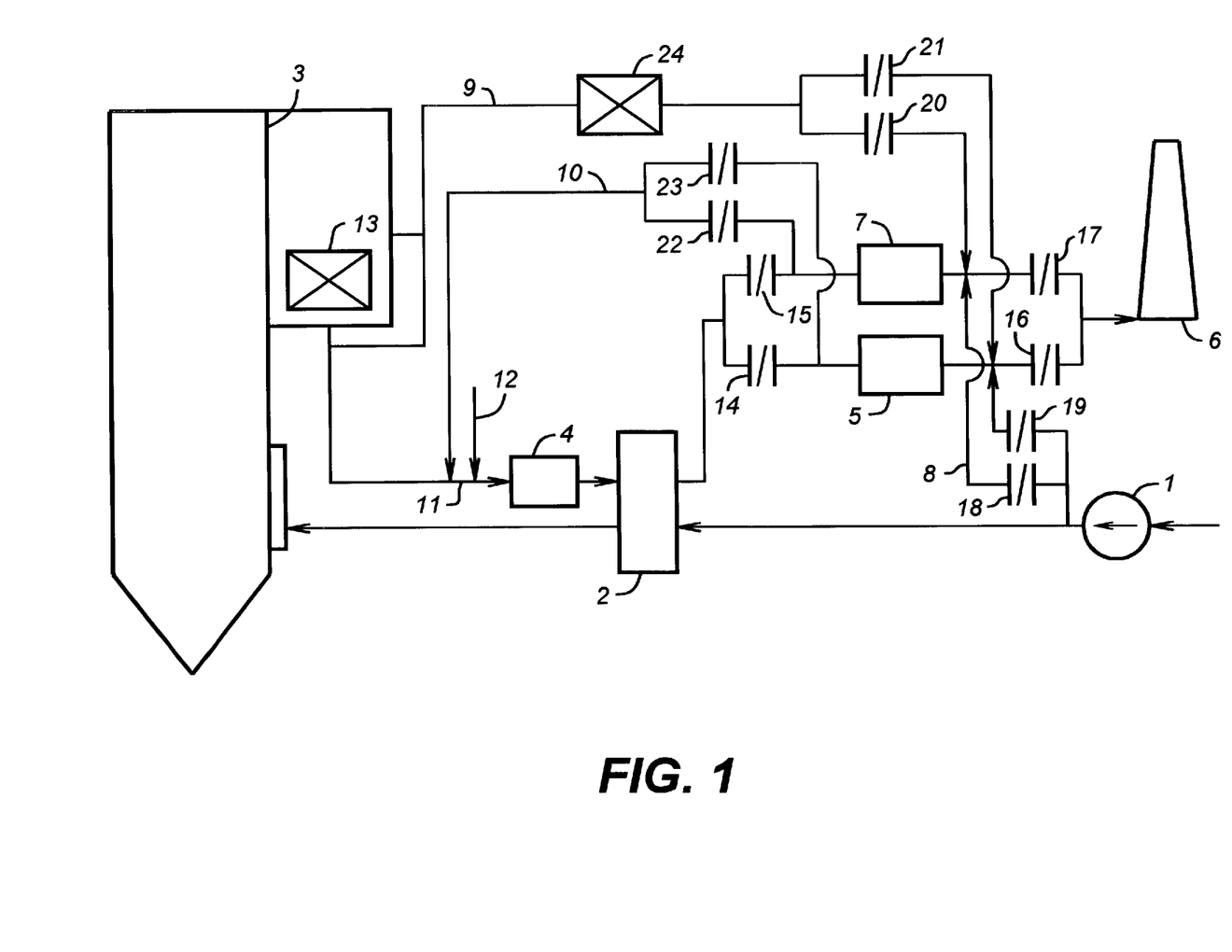
FIG. 1 is a schematic view illustrating one embodiment of the first aspect of the present invention.

FIG. 1 is a schematic illustration of the flues and air ducts of a boiler system in accordance with one embodiment of the first aspect of the present invention.

Combustion air for this boiler system is introduced into a boiler 3 through an air preheater 2 by means of a forced draft fan 1. The nitrogen oxide-containing exhaust gas produced as a result of the combustion of fuel in boiler 3 is denitrated in an ammonia reduction dry denitrator 4. The denitrated exhaust gas, together with unreacted leak ammonia, is passed through air preheater 2 where heat is recovered by the combustion air. The leak ammonia is recovered in leak ammonia recovery units 5,7. Thereafter, the exhaust gas from which nitrogen oxides and leak ammonia have been removed is discharged into the atmosphere through a stack 6.

In the system of FIG. 1, while leak ammonia recovery units 5 and 7 are operated, they are switched over alternatingly between two operational modes. Thus, while one leak ammonia recovery, say unit 5, is recovering leak ammonia from the boiler exhaust gas, the other leak ammonia recovery unit 7 is adjusted to an appropriate temperature by a mixture of the hot exhaust gas 9 from the boiler and cool air 8 diverted from the outlet of the forced draft fan 1. Leak ammonia recovery unit 7 is heated by the hot exhaust gas 9 from the boiler 3 to desorb ammonia therefrom. The desorbed ammonia is fed to a flue 11 through a regenerated ammonia injection line 10 and used for the denitration reaction in the dry denitrator 4 together with ammonia fed through an ammonia injection line 12. The hot exhaust gas 9 from the boiler 3 is extracted from the flue within the boiler 3 in which a heat transfer surface is disposed or from the outlet flue of boiler 3, i.e., from an upstream or downstream position of the heat transfer surface 13. After the desorption of ammonia is completed, leak ammonia recovery unit 7 is cooled by introducing thereinto cool air 8 diverted from the outlet of forced draft fan 1. After being used to cool down leak ammonia recovery unit 7, this air is fed to flue 11 through regenerated ammonia injection line 10.

Dampers 14, 15, 16, 17, 18, 19, 20, 21, 22 and 23 installed in the flues and air ducts are suitably controlled in response to the above-described operation. Specifically, when leak ammonia recovery unit 5 is operated so as to recover leak ammonia and leak ammonia recovery unit 7 is heated to desorb ammonia therefrom, dampers 14, 16, 18, 20 and 22 are opened and dampers 15, 17, 19, 21 and 23 are closed. Damper 20 becomes closed from the above state of operation, when leak ammonia recovery unit 7 is cooled.

When the heating, ammonia desorption, and cooling for leak ammonia recovery unit 7 are completed and the removal of leak ammonia at leak ammonia recovery unit 5 is finished, the dampers are controlled in a reverse manner. That is, dampers 14, 16, 18, 20 and 22 become closed and dampers 15, 17, 19, 21 and 23 are opened. As a result, leak ammonia recovery unit 7 begins to absorb and remove leak ammonia from the exhaust gas, and the heating of leak ammonia recovery unit 5 is started.

Thereafter, leak ammonia recovery units 5 and 7 are similarly operated in such a way that the recovery of ammonia from the exhaust gas and the process of heating, ammonia desorption, and cooling are carried out alternately and repeatedly.

As characteristics common among boilers, the temperature of hot exhaust gas 9 discharged from the boiler 3 operated under a partial load is lower than the temperature attained under the rated load. When operated under-loaded conditions, a sufficiently high temperature may not be attained in leak ammonia recovery unit 7. As a result, the desorption of ammonia from leak ammonia recovery unit 7 may not be fully achieved owing to the characteristics of leak ammonia recovery units. In such a case, a heat source 24, such as an electric heater, heat exchanger or burner, can be operated to further heat the hot exhaust gas 9 discharged from boiler 3 and thereby achieve sufficient desorption of ammonia from leak ammonia recovery unit 7.

Figure 2:
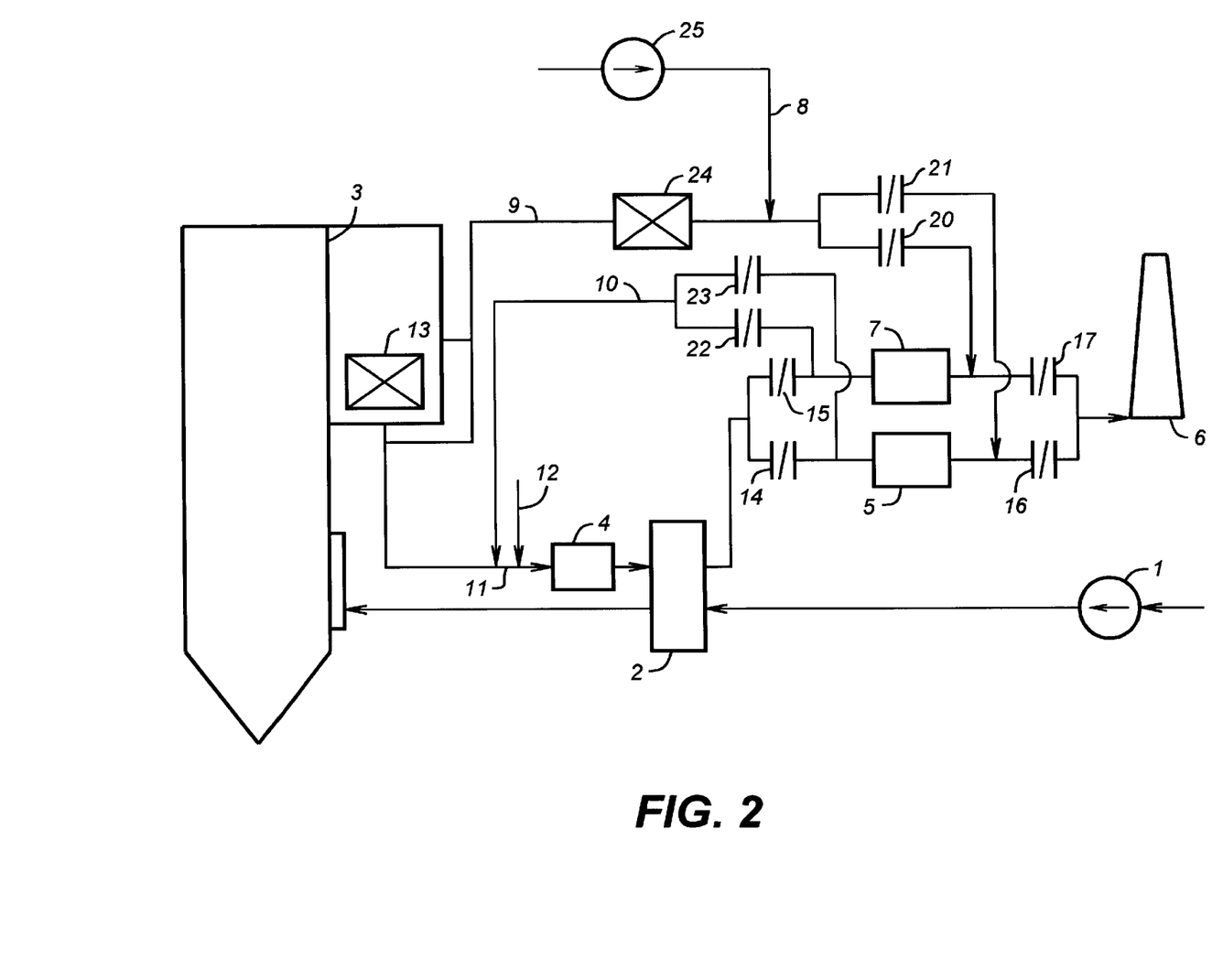
FIG. 2 is a schematic view illustrating another embodiment of the first aspect of the present invention.
Figure 3:
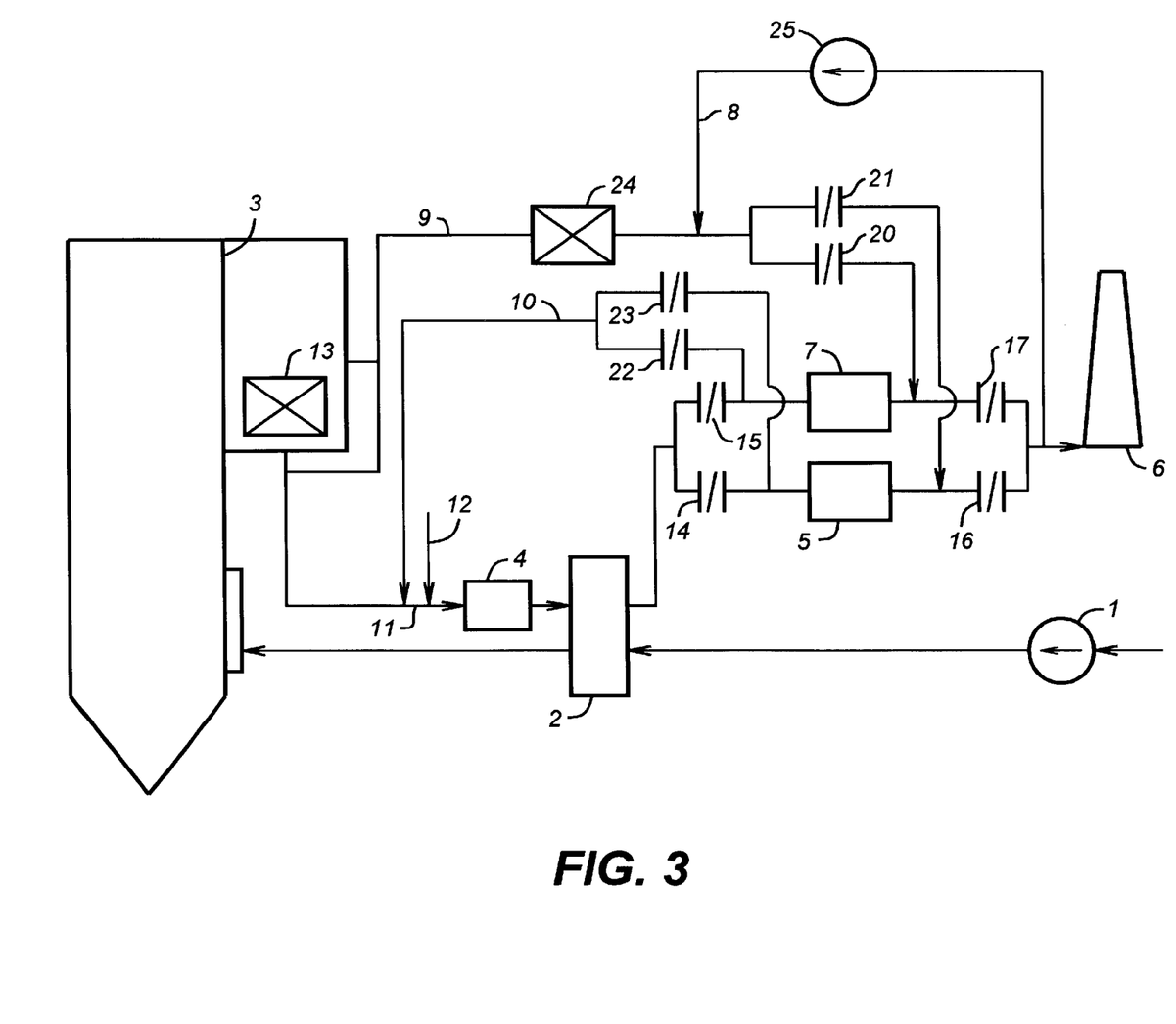
FIG. 3 is a schematic view illustrating still another embodiment of the first aspect of the present invention.

FIGS. 2 and 3 are schematic illustrations of the flues and air ducts of boiler systems in accordance with other embodiments of the first aspect of the present invention. In FIG. 1, leak ammonia recovery unit 7 is heated with the hot exhaust gas 9 discharged from the boiler 3 and adjusted to an appropriate temperature by mixing it with cool air 8 diverted from the outlet of forced draft fan 1, and cooled with the same cool air 8. In contrast, the system of FIG. 2 is such that cool air 8 is supplied by means of a fan 25 for exclusive use, instead of being diverted from the outlet of the forced draft fan 1, and the system of FIG. 3 is such that, in place of cool air, the cool exhaust gas 8 discharged from boiler 3 is supplied by means of a fan 25 which is disposed exclusively for this purpose. In FIGS. 2 and 3, the same components as those illustrated in FIG. 1 are designated by the same reference numerals and no explanation thereof is given here.

Now embodiments according to the second aspect of the present invention will be described.

Taking the system illustrated in FIG. 2 as an example, the following problems may arise when ammonia recovery unit 7 from which ammonia has been desorbed is cooled by introducing thereinto a cooling gas 8, such as cool air or cool boiler exhaust gas, and the used cooling gas is discharged from the system through regenerated ammonia injection line 10. That is, when ammonia recovery units 5 and 7 are installed and the cooling gas 8, such as cool air or cool boiler exhaust gas, used to cool them is discharged from the system using regenerated ammonia injection line 10, the flow rate of the gas passing through air preheater 2 relative to the flow rate of the air passing through the same increases as compared with the case where no ammonia recovery unit is installed (i.e., the recovery of ammonia is not carried out). Consequently, in the former case where a cooling gas 8 such as cool air or cool boiler exhaust gas is used to cool ammonia recovery unit 7 and becomes heated therein, the recovery of the heat the air or gas has is more difficult than in the case where no ammonia recovery unit is installed. More specifically, the flow rate of the gas passing through air preheater 2 increases relative to the flow rate of the air passing through the same, resulting in an increased heat loss with an increased amount of discharged exhaust gas and a reduction in boiler efficiency. Moreover, when the size of air preheater 2 is the same as in the case where no ammonia recovery unit is installed, the temperature of the exhaust gas at the outlet of air preheater 2 is elevated. This may result in an increased heat loss of exhaust gas and a reduction in boiler efficiency. Conversely, in order to prevent the temperature of the exhaust gas at the outlet of air preheater 2 from being elevated, it is necessary to increase the size of air preheater 2 as compared with the case where no ammonia recovery unit is installed. However, this leads to an increase in equipment cost. Furthermore, even if the size of air preheater 2 is increased, it may be difficult to prevent the increase in exhaust gas loss due to the increase in the flow rate of the gas passing through air preheater 2.

According to the second aspect of the present invention, these disadvantages that may arise under certain circumstances can be avoided.

Figure 4:
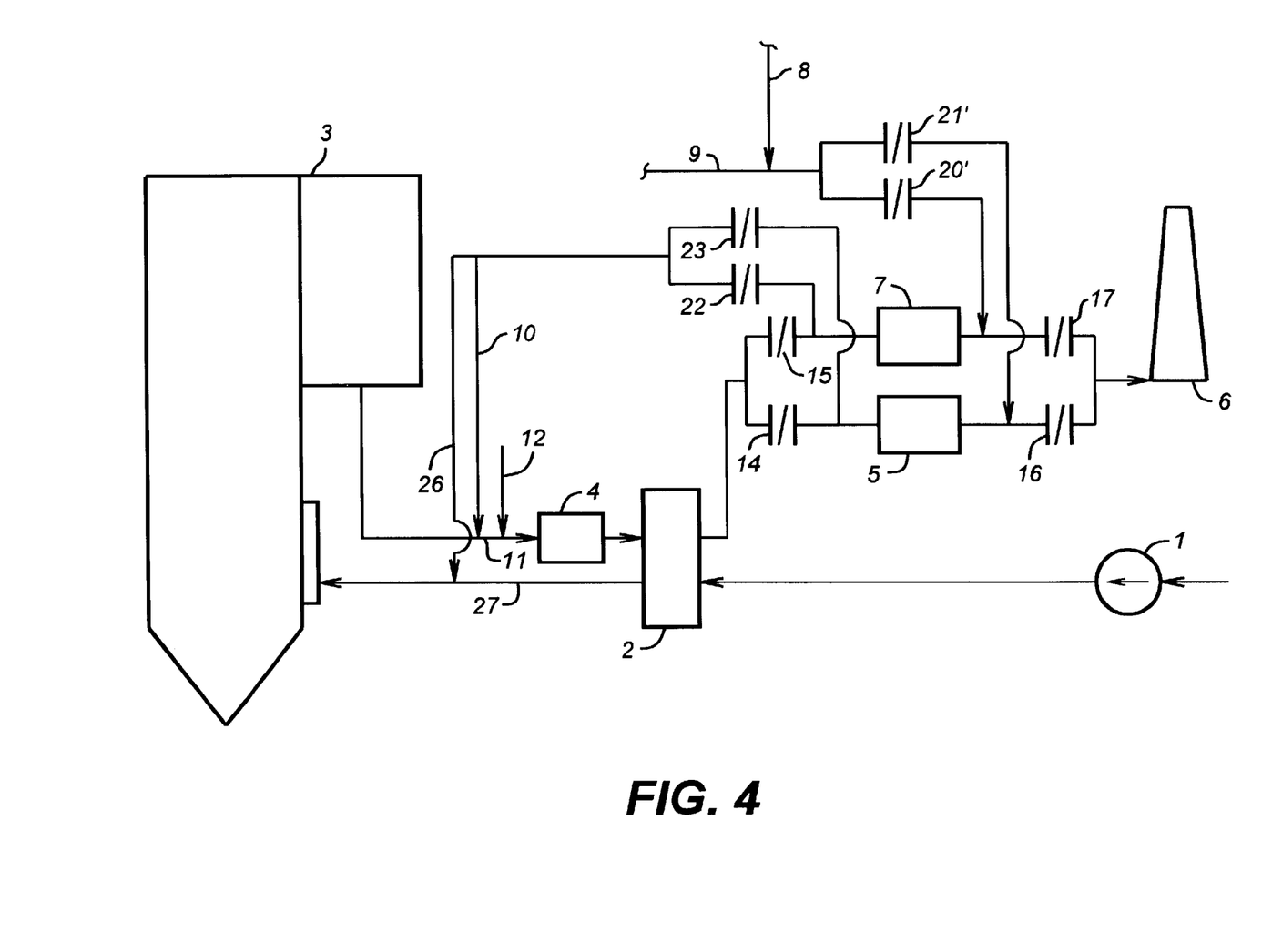
FIG. 4 is a schematic illustration of the flues and air ducts of a boiler system in accordance with one embodiment of the second aspect of the present invention.

FIG. 4 is a schematic illustration of the flues and air ducts of a boiler system in accordance with one embodiment of the second aspect of the present invention. In the embodiment illustrated in FIG. 4, cool air is used as the cooling gas for ammonia recovery units and then fed to the main air duct at the outlet of the air preheater.

In FIG. 4, the actions and functions of the forced draft fan 1, air preheater 2, a boiler 3, dry denitrator 4, ammonia recovery units 5 and 7, stack 6, cool air (cooling gas) 8, hot gas 9, regenerated ammonia injection line 10, flue 11, and ammonia injection line 12 are essentially the same as described above in connection with the first aspect of the invention, particularly shown in FIG. 2.

When ammonia recovery unit 7 is heated to desorb ammonia therefrom, hot gas 9 introduced into ammonia recovery unit 7 becomes mixed with the desorbed ammonia as it leaves the unit. The resulting gas mixture is fed to the flue 11 through the regenerated ammonia injection line 10 and used for the denitration reaction in the dry denitrator 4 together with ammonia fed through the ammonia injection line 12. After the desorption of ammonia is completed, ammonia recovery unit 7 is cooled by introducing thereinto cool air 8 in place of hot gas 9. This cool air, which has now been heated by ammonia recovery unit 7, is fed to the main air duct 27 through a cooling gas recovery line 26 (and not through the regenerated ammonia injection line 10) as combustion air for the boiler 3. Thus, the heated air is not fed directly to the flue 11, so that the flow rate of the exhaust gas passing through the air preheater 2 does not increase relative to the flow rate of the air passing through the same. The regenerated ammonia injection line 10 and the cooling gas recovery line 26 are selectively operated with the aid of a suitable changeover device (not shown). More specifically, the regenerated ammonia injection line 10 is used when either one of the ammonia recovery units 5 and 7 is heated to desorb ammonia therefrom, while the cooling gas recovery line 26 is used when ammonia recovery unit 5 or 7 is cooled. Although the second aspect of the present invention has been described above in connection with the embodiment in which cool air is used as the cooling gas, similar effects can also be achieved by using cool exhaust gas collected from the flue between ammonia recovery units 5, 7 and stack 6.

Figure 5:
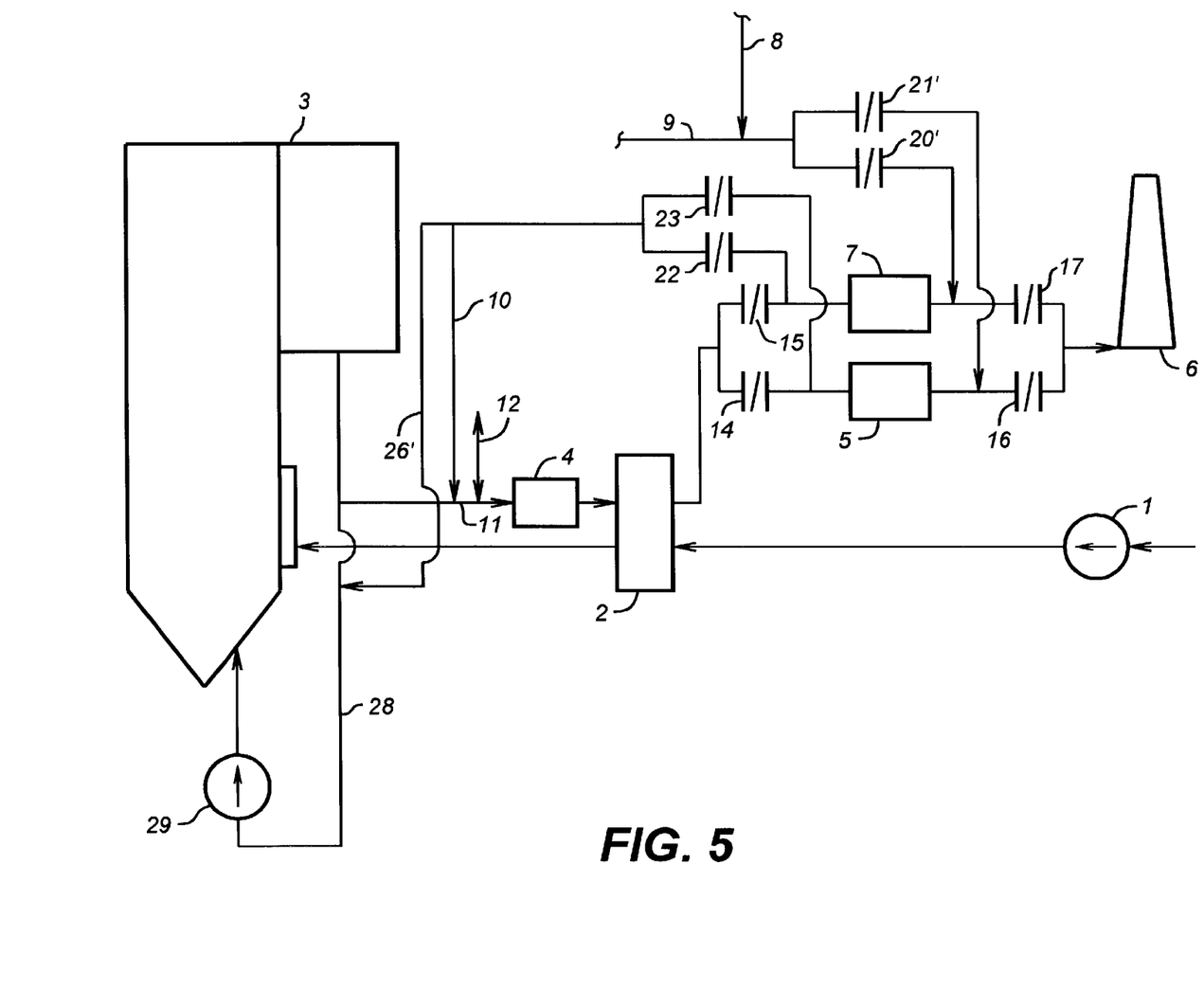
FIG. 5 is a schematic illustration of the flues and air ducts of a boiler system in accordance with another embodiment of the second aspect of the present invention.

FIG. 5 is a schematic illustration of the flues and air ducts of a boiler system in accordance with another embodiment of the second aspect of the present invention. In the embodiment illustrated in FIG. 5, cool boiler exhaust gas is used as the cooling gas for ammonia recovery units and then fed to the circulating gas line of the boiler.

In FIG. 5, the actions and functions of the forced draft fan 1, air preheater 2, boiler 3, dry denitrator 4, ammonia recovery units 5 and 7, stack 6, cool boiler exhaust gas (cooling gas) 8, hot gas 9, regenerated ammonia injection line 10, flue 11, and ammonia injection line 12 are essentially the same as described above in connection with the first aspect of the invention, particularly in FIG. 2.

When ammonia recovery unit 7 is heated to desorb ammonia therefrom, the regenerated ammonia injection line 10 is used in the same manner as in the embodiment of FIG. 4. After the desorption of ammonia is completed, ammonia recovery unit 7 is cooled with cool boiler exhaust gas 8. This cool boiler exhaust gas 8 fed to the recirculating gas line 28 of the boiler 3 through a cooling gas recovery line 26'. Thus, similarly to the embodiment of FIG. 4, the cool boiler exhaust gas 8 is not fed to the flue 11, so that the flow rate of the gas passing through air preheater 2 does not increase relative to the flow rate of the air passing through the same. The regenerated ammonia injection line 10 and the cooling gas recovery line 26' are selectively operated with the aid of a suitable changeover device (not shown). More specifically, the regenerated ammonia injection line 10 is used when either one of the ammonia recovery units 5 and 7 is heated to desorb ammonia therefrom, while cooling gas recovery line 26' is used when ammonia recovery unit 5 or 7 is being cooled. In FIG. 5, reference numeral 29 designates a gas recirculation fan.

Figure 6:
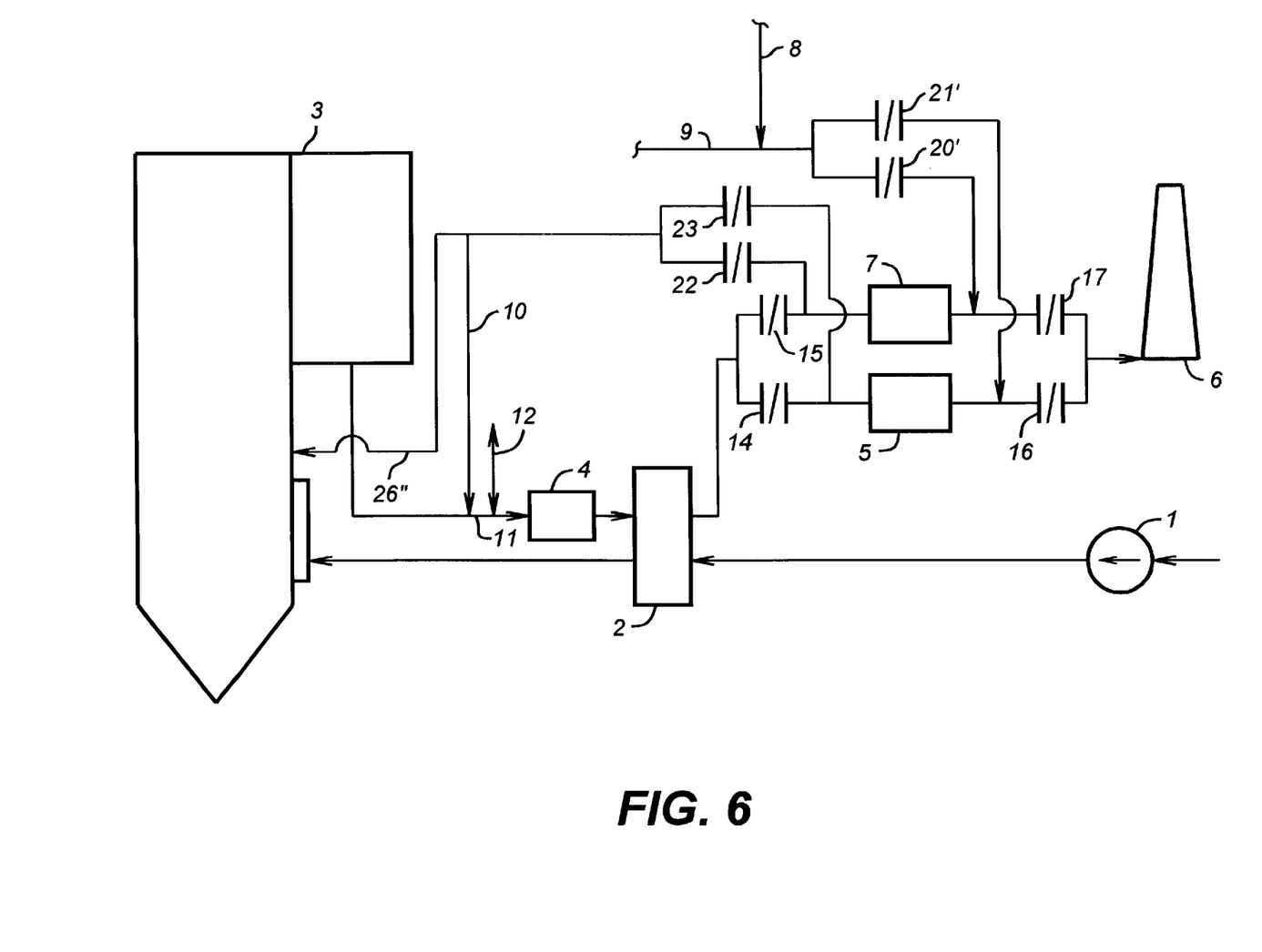
FIG. 6 is a schematic illustration of the flues and air ducts of a boiler system in accordance with still another embodiment of the second aspect of the present invention.

FIG. 6 illustrates a modification of the embodiment of FIG. 5. In the embodiment illustrated in FIG. 6, exhaust gas 8 used to cool the ammonia recovery units is fed directly to the upper part of the furnace of the boiler 3 through line 26", instead of being fed to the recirculating gas line 28 having the gas recirculation fan 29 as illustrated in FIG. 5.

Now an embodiment according to the third aspect of the present invention will be discussed.

Taking a system illustrated in FIG. 2 as an example, when the ammonia desorbed from leak ammonia recovery unit 7 is fed to the flue 11 through the regenerated ammonia injection line 10 and the boiler exhaust gas within the flue 11 happens to have a pressure higher than atmospheric pressure, the gas pressure of leak ammonia recovery unit 7 from which ammonia is being desorbed will become higher than that of the boiler exhaust gas within the flue 11. Consequently, leak ammonia recovery unit 7 will also have a gas pressure higher than atmospheric pressure. Since the mixture of hot gas 9 and ammonia desorbed from leak ammonia recovery unit 7 has a high ammonia concentration, any leakage of gas from the regenerated ammonia injection line 10 may be dangerous to the environment and human health, even if the amount of the leaking gas is small.

Moreover, when the pressure of the boiler exhaust gas is higher than atmospheric pressure, the required pressure of the hot gas 9 and cooling gas 8 becomes excessively high. Accordingly, in order to secure a sufficient pressure, the hot gas 9 and cooling gas 8 must be supplied from high-pressure sources.

Figure 7:
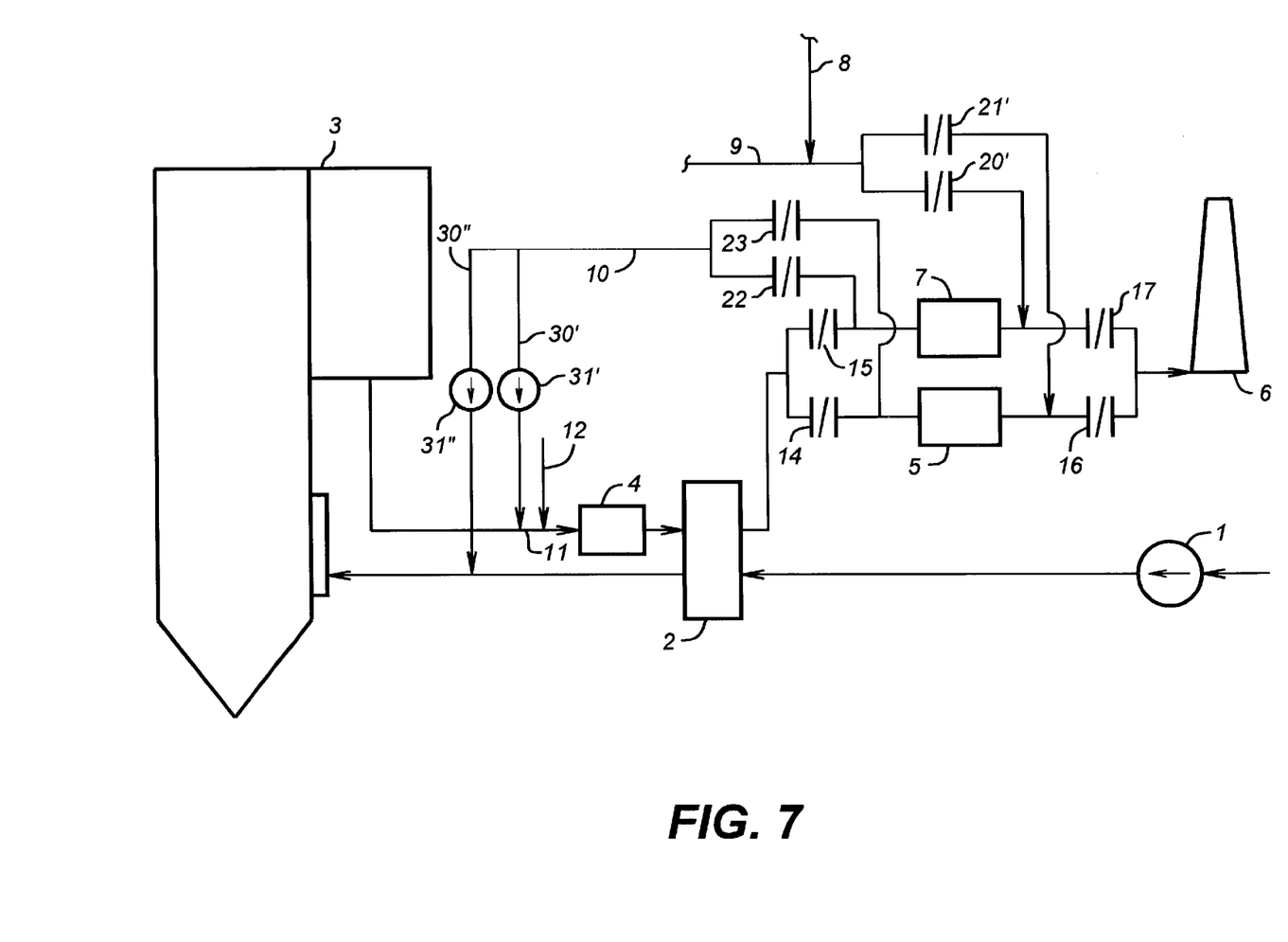
FIG. 7 is a schematic view illustrating one embodiment of the third aspect of the present invention.

FIG. 7 is a schematic illustration of the flues and air ducts of a boiler system in accordance with one embodiment of the third aspect of the present invention. In FIG. 7, reference numeral 1 designates a forced draft fan; 2 an air preheater; 3 a boiler; 4 an ammonia reduction dry denitrator; 5 and 7 leak ammonia recovery units; 6 a stack; 8 a cooling gas; 9 a hot gas; 10 an outlet pipe for first and second gases discharged from the leak ammonia recovery units; 30' a first gas injection line; 30" a second gas injection line; 11 a flue; 12 an ammonia injection line; 31' and 31" fans; and 14 to 17, 22, 23, 20' and 21' dampers.

By the use of fan 31', leak ammonia recovery unit 5 or 7 which is being heated with the hot gas 9 to desorb ammonia therefrom is operated so as to have an appropriate gas pressure equal to or lower than atmospheric pressure. At the same time, the first gas comprising a mixture of the hot gas 9 and ammonia desorbed from leak ammonia recovery unit 5 or 7 is pressurized to a pressure corresponding to the gas pressure in the flue 11 and then fed to the flue 11. During this process, fan 31" is stopped and the second gas injection line 30" is closed with a damper (not shown). Similarly, by the use of fan 31", leak ammonia recovery unit 5 or 7 which is being cooled with the cooling gas 8 is also operated so as to have an appropriate gas pressure equal to or lower than atmospheric pressure. At the same time, the second gas comprising a mixture of the cooling gas 8 and ammonia discharged from leak ammonia recovery unit 5 or 7 is pressurized to a pressure corresponding to the pressure of the main air duct for supplying air to the boiler 3 and then fed to the main air duct. During this process, fan 31' is stopped and the first gas injection line 30' is closed with a damper (not shown).

In the embodiment illustrated in FIG. 7, the second gas is fed to the main air duct which supplies combustion air to the boiler. However, the second gas may be fed directly to the boiler 3. Moreover, in the illustrated embodiment, fans 31' and 31" are installed in the first gas injection line 30' and the second gas injection line 30", respectively. However, these fans 31' and 31" installed in the first gas injection line 30' and the second gas injection line 30" may be replaced by a single fan (not shown) installed in the outlet pipe 10 for the first and second gases. In this case, a valve (not shown) needs to be installed so as to supply the gases selectively to first gas injection line 30' or the second gas injection line 30".

I claim:

1. A denitration system comprising a source of gas comprising nitrogen oxide, an ammonia injection line for injecting ammonia, an ammonia reduction denitrator, communicable with said ammonia injection line, for denitrating said nitrogen oxide-containing gas, at least two leak ammonia recovery units, communicable with said denitrator, which adsorb and remove ammonia escaping from said ammonia reduction denitrator, a first gas line connecting said source of nitrogen oxide-containing gas to said leak ammonia recovery units for supplying said nitrogen oxide-containing gas to said leak ammonia recovery units for desorption of absorbed ammonia, an air supply line with a fan for supplying air to said leak ammonia recovery units, said air supply line connected to an end of each of said leak ammonia recovery units to which end said first gas line is connected so as to cool said leak ammonia recovery units after ammonia is desorbed from said units, a desorption gas line connecting said leak ammonia recovery units to a line connecting said source of nitrogen oxide-containing gas with said ammonia reduction denitrator so that a desorption gas containing ammonia desorbed from said leak ammonia recovery units is supplied to the ammonia reduction denitrator, means being provided so that operation of said leak ammonia recovery units is switched over in such a way that during operation at least one of the leak ammonia recovery units removes leak ammonia from said nitrogen oxide-containing gas outputted from said ammonia reduction denitrator as a result of denitration of said nitrogen oxide containing gas while absorbed ammonia is desorbed from another leak ammonia recovery unit or said another leak ammonia recovery unit is cooled, and a second line connected to said first gas line for introducing air to said first gas line so as to adjust the temperature of the gas in said first gas line to be supplied to said ammonia recovery units for desorption of adsorbed ammonia therefrom.

2. The denitration system claimed in claim 1 wherein said fan for supplying air to said leak recovery units also supplies air to said source of nitrogen oxide-containing gas, the air supply line is also connected to the source of the nitrogen oxide-containing gas for supplying air to said source of nitrogen oxide-containing gas.

3. A denitration system comprising a source of a gas containing nitrogen oxide, an ammonia reduction denitrator for denitrating said nitrogen oxide-containing gas, a source of ammonia to be supplied to said denitrator, at least two leak ammonia recovery units which adsorb and remove ammonia escaping from said ammonia reduction denitrator, a first gas line connecting said source of nitrogen oxide-containing gas to said leak ammonia recovery units for supplying said nitrogen oxide-containing gas to said leak ammonia recovery units for desorption of adsorbed ammonia, a gas supply line with a fan for supplying a treated gas coming out of said leak ammonia recovery units to at least one of said leak ammonia recovery units so as to cool said at least one leak ammonia recovery unit after ammonia is desorbed from said at least one leak recovery ammonia unit, a desorption gas line connecting said leak ammonia recovery units to a line connecting said source of nitrogen oxide-containing gas with said ammonia reduction denitrator so that a desorption gas containing ammonia desorbed from said leak ammonia recovery units is supplied to the ammonia reduction denitrator, valves being provided so that operation of said leak ammonia recovery units is switched over in such a way that during operation at least one of the leak ammonia recovery units removes leak ammonia from said nitrogen oxide-containing gas outputted from said ammonia reduction denitrator as a result of denitration of said nitrogen oxide-containing gas while adsorbed ammonia is desorbed from another leak ammonia recovery unit or said another leak ammonia recovery unit is cooled, and a second line connected to said first gas line for introducing air to said first gas line so as to adjust the temperature of the gas in said first gas line to be supplied to said ammonia recovery units for desorption of adsorbed ammonia therefrom.

4. A denitration system comprising a source of gas comprising nitrogen oxide, an ammonia injection line for injecting ammonia, an ammonia reduction denitrator, communicable with said ammonia injection line, for denitrating said nitrogen oxide-containing gas, at least two leak ammonia recovery units, communicable with said denitrator, which adsorb and remove ammonia escaping from said ammonia reduction denitrator, a first gas line connecting said source of nitrogen oxide-containing gas to said leak ammonia recovery units for supplying said nitrogen oxide-containing gas to said leak ammonia recovery units for desorption of absorbed ammonia, an air supply line with a fan for supplying air to said leak ammonia recovery units, said air supply line connected to an end of each of said leak ammonia recovery units to which end said first gas line is connected so as to cool said leak ammonia recovery units after ammonia is desorbed from said units, a desorption gas line connecting said leak ammonia recovery units to a line connecting said source of nitrogen oxide-containing gas with said ammonia reduction denitrator so that a desorption gas containing ammonia desorbed from said leak ammonia recovery units is supplied to the ammonia reduction denitrator, means being provided so that operation of said leak ammonia recovery units is switched over in such a way that during operation at least one of the leak ammonia recovery units removes leak ammonia from said nitrogen oxide-containing gas outputted from said ammonia reduction denitrator as a result of denitration of said nitrogen-oxide containing gas while absorbed ammonia is desorbed from another leak ammonia recovery unit or said another leak ammonia recovery unit is cooled, and a second gas line connected to said first gas line and said end of each of said leak ammonia recovery units for introducing a treated gas coming out of at least one of said leak ammonia recovery units so as to adjust the temperature of the gas in said first gas line to be supplied to said ammonia recovery units for desorption of adsorbed ammonia therefrom.

5. The denitration system claimed in claim 4 wherein said fan for supplying air to said leak recovery units also supplies air to said source of nitrogen oxide-containing gas, the air supply line is also connected to the source of the nitrogen oxide-containing gas for supplying air to said source of nitrogen oxide-containing gas.

6. A denitration system comprising a source of a gas containing nitrogen oxide, an ammonia reduction denitrator for denitrating said nitrogen oxide-containing gas, a source of ammonia to be supplied to said denitrator, at least two leak ammonia recovery units which adsorb and remove ammonia escaping from said ammonia reduction denitrator, a first gas line connecting said source of nitrogen oxide-containing gas to said leak ammonia recovery units for supplying said nitrogen oxide-containing gas to said leak ammonia recovery units for desorption of adsorbed ammonia, a gas supply line with a fan for supplying a treated gas coming out of said leak ammonia recovery units to at least one of said leak ammonia recovery units so as to cool said at least one leak ammonia recovery unit after ammonia is desorbed from said at least one leak recovery ammonia unit, a desorption gas line connecting said leak ammonia recovery units to a line connecting said source of nitrogen oxide-containing gas with said ammonia reduction denitrator so that a desorption gas containing ammonia desorbed from said leak ammonia recovery units is supplied to the ammonia reduction denitrator, valves being provided so that operation of said leak ammonia recovery units is switched over in such a way that during operation at least one of the leak ammonia recovery units removes leak ammonia from said nitrogen oxide-containing gas outputted from said ammonia reduction denitrator as a result of denitration of said nitrogen oxide-containing gas while adsorbed ammonia is desorbed from another leak ammonia recovery unit or said another leak ammonia recovery unit is cooled, and a second gas line connected to said first gas line and said end of each of said leak ammonia recovery units for introducing the treated gas coming out of at least one of said leak ammonia recovery units so as to adjust the temperature of the gas in said first gas line to be supplied to said ammonia recovery units for desorption of adsorbed ammonia therefrom.

* * * * *